(12) United States Patent
Buican et al.

(10) Patent No.: US 6,297,948 B1
(45) Date of Patent: Oct. 2, 2001

(54) PANEL MOUNTING SYSTEM

(75) Inventors: Eugene Buican, Austin; Paul Higgins, Round Rock, both of TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 09/520,470

(22) Filed: Mar. 7, 2000

(51) Int. Cl.$^7$ .................................................. G06F 1/16
(52) U.S. Cl. ...................... 361/683; 361/727; 312/223.1; 206/320
(58) Field of Search ..................................... 361/683, 680, 361/681, 724–727; 312/223.1–223.3; 400/713, 714; 206/320, 576

(56) References Cited

U.S. PATENT DOCUMENTS

| | | | |
|---|---|---|---|
| 3,671,065 | 6/1972 | Bingham | 292/175 |
| 4,679,368 | 7/1987 | Pettinga et al. | 52/36 |
| 4,974,740 | 12/1990 | Niles et al. | 220/324 |
| 4,993,758 | 2/1991 | Schmutzler | 292/152 |
| 5,031,070 | 7/1991 | Hsu | 361/725 |
| 5,348,356 | 9/1994 | Moulton | 292/80 |
| 5,593,220 | 1/1997 | Seid et al. | 312/265.6 |
| 5,713,647 | 2/1998 | Kim | 312/223.1 |
| 5,751,545 | 5/1998 | Jung | 361/683 |
| 5,820,235 | 10/1998 | Tsai | 312/223.1 |
| 5,823,644 | 10/1998 | Suh et al. | 312/223.2 |
| 5,826,922 | 10/1998 | Wernig | 292/39 |
| 5,828,545 | * 10/1998 | Loudenslager | 361/683 |
| 5,882,052 | 3/1999 | Whitehead | 292/80 |
| 5,896,273 | * 4/1999 | Varghese et al. | 361/724 |
| 6,125,035 | * 9/2000 | Hood, III et al. | 361/687 |
| 6,137,677 | * 10/2000 | Ganthier et al. | 361/683 |
| 6,157,532 | * 12/2000 | Cook et al. | 361/681 |

* cited by examiner

Primary Examiner—Leo P. Picard
Assistant Examiner—Hung Van Duong
(74) Attorney, Agent, or Firm—Haynes and Boone, L.L.P.

(57) ABSTRACT

A panel latch system includes a chassis and a plurality of panels mounted on the chassis in a closed position. A latch body is mounted on the chassis for latched engagement with the panels. The latch body is spring loaded so as to be movable between a static position and a plurality of displaced positions for unlatching the panels. A first latch portion on the latch body is provided for releasing a first panel in response to the latch body being moved in a first direction from the static position to a first displaced position. A second latch portion on the latch body is provided for releasing a second panel in response to the latch body being moved in a second direction from the static position to a second displaced position.

20 Claims, 9 Drawing Sheets

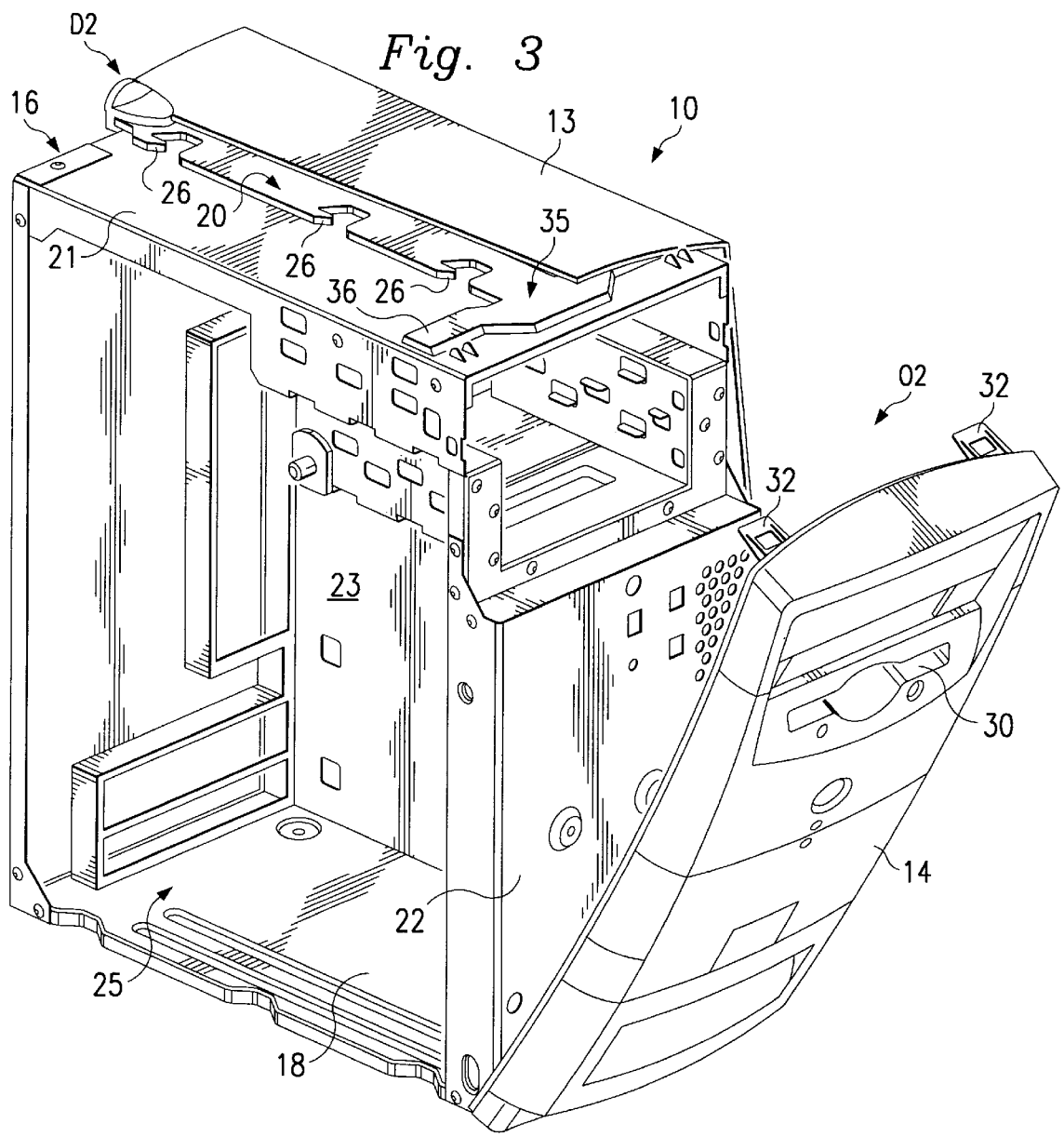

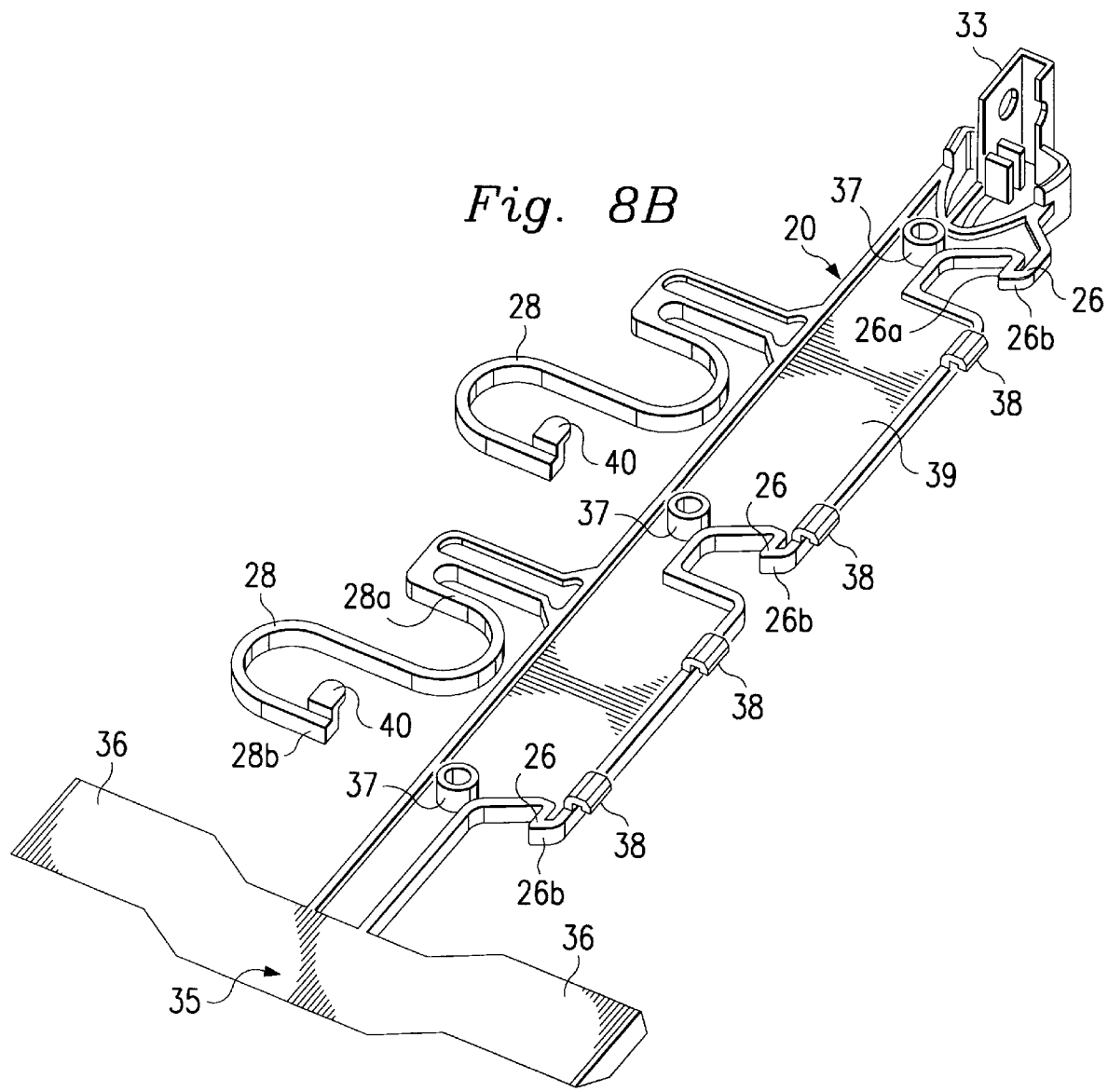

PANEL MOUNTING SYSTEM

BACKGROUND

The disclosures herein relate generally to computer systems and more particularly to a panel mounting apparatus for an enclosure of a computer system.

A computer system such as a desktop personal computer typically includes a chassis made of a metal material. To provide for an aesthetically pleasing appearance and for various functional purposes, a variety of plastic panels are used to cover portions of the chassis. Typically, the top, sides and front of the chassis are substantially covered by plastic panels. The front is typically covered with a bezel panel. The sides are generally covered with side panels. One of the side panels is generally removable and one may be stationary. The removable side panel is intended to provide relatively easy access to the system components mounted within the chassis. The top of the chassis is generally covered with a top panel. However, in some computer designs, the top panel and at least one of the side panels are integrally formed.

Some panels are mounted with panel mounting systems that make the panels difficult to remove and reinstall. This includes systems that utilize a sliding panel configuration. The ease by which the panel can be removed and reinstalled is adversely affected by interference between the chassis and the panels. Other panel mounting systems utilize a detachable clip configuration that allows the panel to be unhooked from the chassis and then lifted out of the way. The detachable clips are susceptible to breakage and require precise alignment to properly reinstall the panel.

U.S. Pat. No. 5,826,922 discloses a rotary latch assembly which allows for the attachment of a computer bezel to a computer housing. Latches disposed on each side of the bezel engage openings in the computer housing so as to secure the bezel to the computer housing. The latches are attached to rails which include gears. A knob which includes rotary gears extends through an opening in the bezel. The rotary gears engage the gears of both of the rails such that the latches may be moved within a limited range by rotating the knob. Thus, the bezel may be removed by rotating the knob such that the latches move inward, thereby disengaging the latches from the openings in the computer housing.

U.S. Pat. No. 5,820,235 discloses a front panel assembly for attachment to a mainframe of a computer. The panel assembly includes a base frame having two longitudinal sliding grooves bilaterally disposed at the front side, and a bottom cover on the lower half of the base frame including an air filter. A gear holder is mounted on the base frame and holds a gear. A dust cover is mounted on the base frame and moves along the longitudinal sliding grooves between closed and open positions. The dust cover has a longitudinal rack meshed with the gear and a locating hole at the back near the top. A latch on the base frame is forced by a spring into engagement with the locating hole of the dust guard to lock the dust guard in the closed position, and a spring-supported press button on the base frame is controlled to release the latch from the locating hole of the dust guard.

U.S. Pat. No. 5,751,545 discloses a chassis of a desktop personal computer where the cover can be assembled onto and removed from the base by a user without the use of screws or tools. This allows the user to gain easy access to the electrical components mounted inside the chassis. The design of the base and the cover incorporates a set of guide pins that are inserted into a corresponding set of guide holes in order to properly position the cover onto the base. The cover is fastened to the base by rotating a buckle pivotally attached to the cover so that it engages the base. Finally, a slidable detent located on the cover can be slid onto the buckle, preventing the buckle from inadvertently becoming unfastened. To disassemble the cover from the base, the process is reversed. First, the detent is slid off the buckle, allowing the buckle to rotate. Next, the buckle is disengaged from the base by pivoting it to the open position. Finally, the cover is removed from the base by sliding the cover off the base while extracting the guide pins from the guide pin holes.

U.S. Pat. No. 5,713,647 discloses a computer case that allows a user to open and close the case without the use of special tools or screws. A user slides two sliders on the cover of the case toward each other and lifts up the front portion of the cover to gain access to the interior of the case. The slider is monolithically integrated with a latch. The latch contains two spaced-apart arms and a recess. One of the arms of the latch is arcuate for guiding a portion of the base and a portion of a cover into the recess so that both portions are mated for preventing inadvertent opening of the case. This mating can be accomplished by sliding a pair of sliders in the appropriate directions. To disengage the cover from the base, the sliders are actuated to move a portion of the base from contact with a portion of the cover. When the case is released, the front of the cover can be lifted up. A pair of hinges in the rear of the case allows the front of the case to be pivoted open while preventing the cover from being completely detached from the base.

Typically, removable side panels include one or more shielding members for reducing electromagnetic emissions from the computer. However, if the side panel is not properly positioned when it is reinstalled after service is performed inside the chassis of a computer, the intended electromagnetic emissions protection is reduced. Also, improper positioning of the side panel may preclude the panel from being locked in place. For ergonomic and marketing reasons, removal of the various panels for accessing the system components should not be an undesirable experience for the computer user.

Bezel panels often have openings for providing access to peripheral devices such as a floppy disk drive or a compact disk drive that are attached to the chassis beneath the bezel panel. To ensure that each opening in the bezel is accurately aligned with the corresponding peripheral device, the bezel panel must be properly aligned to the chassis. In addition to electromagnetic emission considerations, misalignment of the bezel panel with respect to the chassis may complicate or preclude access to the peripheral devices under the bezel.

Accordingly, there is a need for an easy-to-operate, cost-effective mounting system that allows a plurality of panels to be easily and reliable installed on and removed from the chassis of a computer system.

SUMMARY

One embodiment, accordingly, provides a latch mechanism that controls the release of a plurality of panels from the chassis of an electronic device. To this end, a panel latch system includes a chassis and a plurality of panels mounted on the chassis in a closed position. A latch body is mounted on the chassis. The latch body is movable between a static position and a plurality of displaced positions. A catch portion is attached to the latch body. The catch portion engages a first one of the panels for securing the first one of the panels in the respective closed position when the latch body is in the static position. The catch portion is disengaged from the first one of the panels for permitting the first one of the panels to be moved to the corresponding open position when the latch body is moved to a first one of the displaced positions. A release portion is attached to the latch body. The release portion disengages a retention member of a second one of the panels from the chassis for permitting the second panel to be moved to a corresponding open position when the latch body is moved to a second one of the displaced positions.

A principal advantage of this embodiment is that the use of a single latch mechanism for releasing a plurality of panels from a chassis reduces manufacturing cost.

BRIEF DESCRIPTION OF THE DRAWING FIGURES

FIG. 3 is a perspective view illustrating an embodiment of the computer with a bezel panel in an open position.

FIG. 8B is a bottom view of the latch illustrated in FIG. 8A.

DETAILED DESCRIPTION

Figure 1:
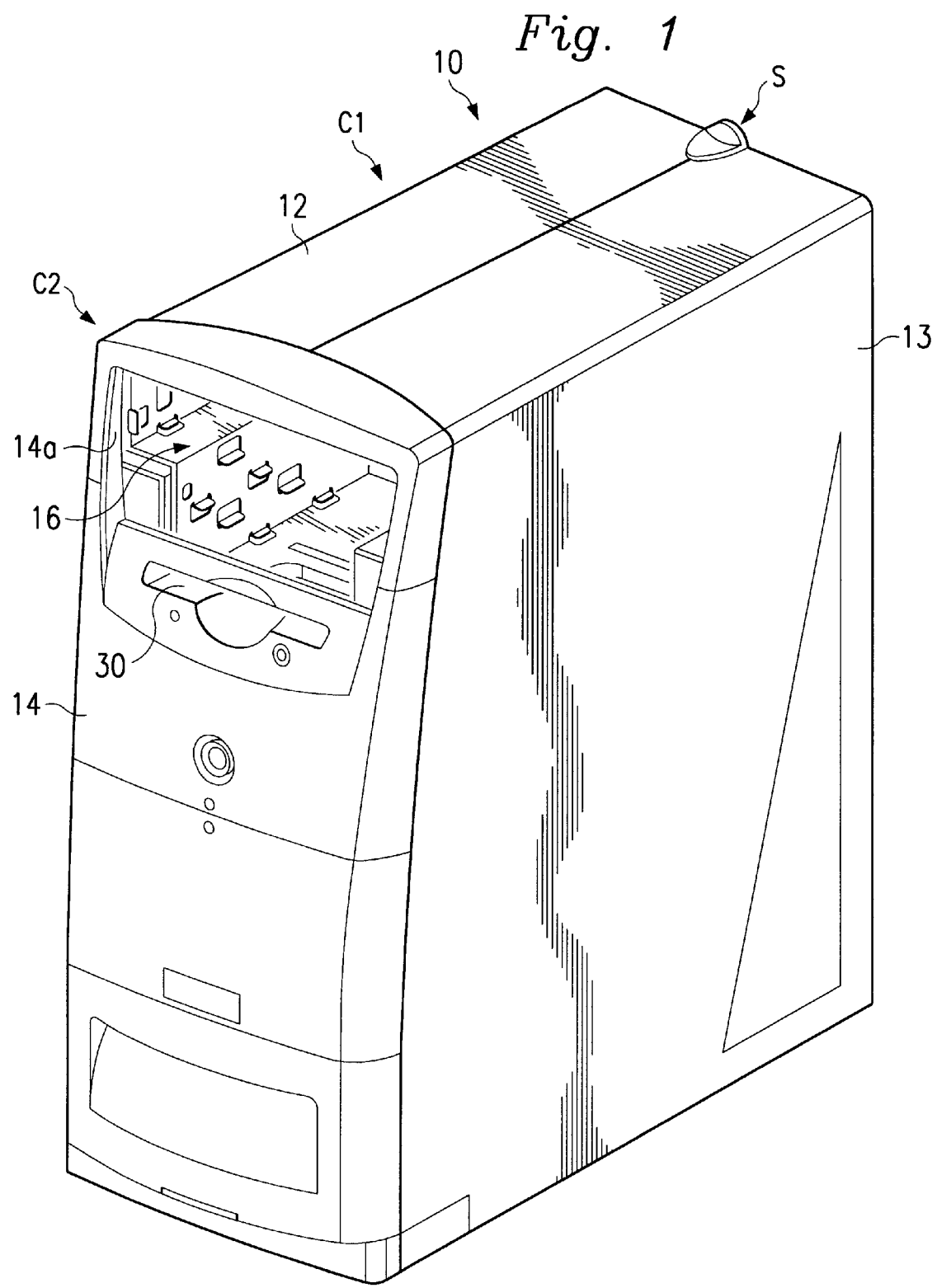
FIG. 1 is a perspective view illustrating an embodiment of a computer including a plurality of panels.
Figure 2:
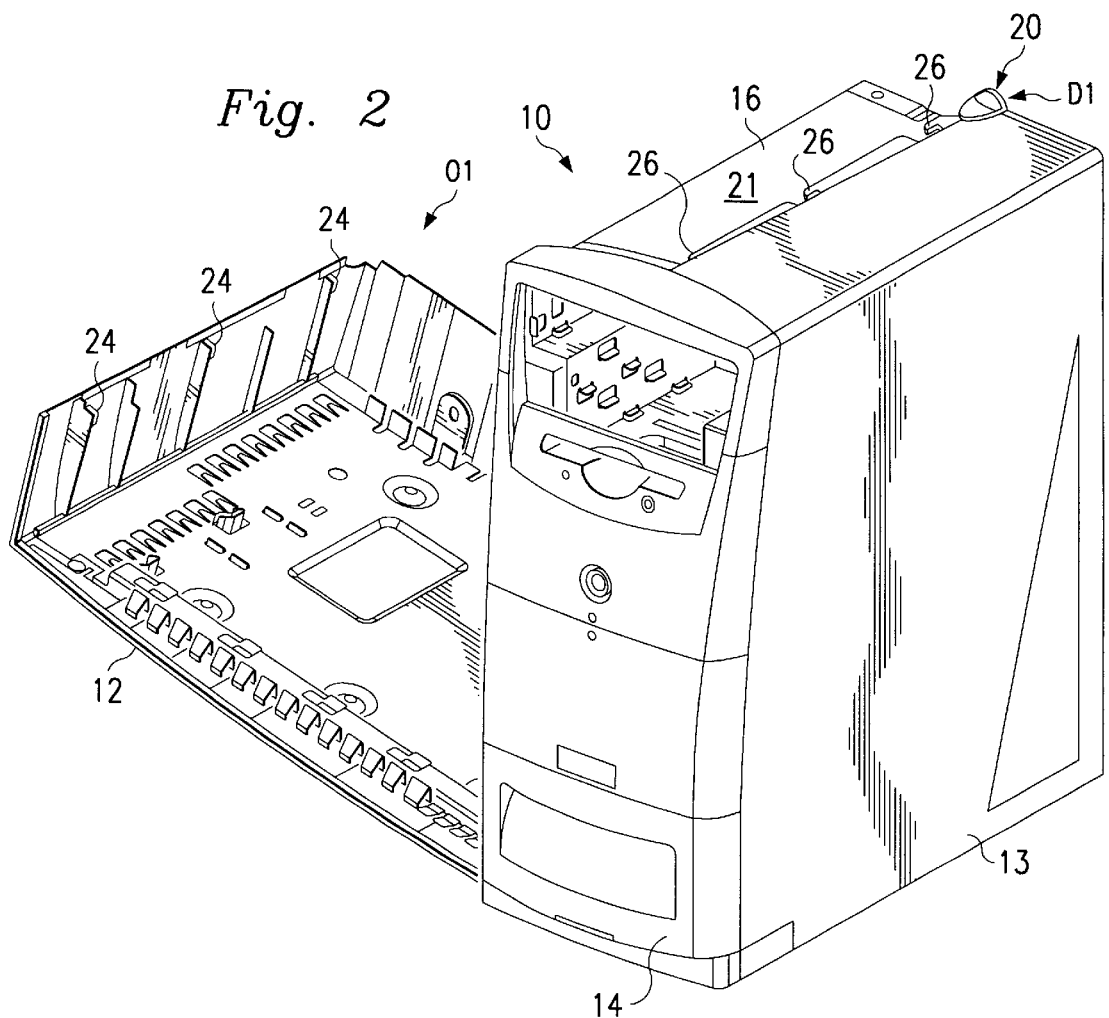
FIG. 2 is a perspective view illustrating an embodiment of the computer with a removable side panel in an open position.

An embodiment of a computer 10 is illustrated in FIGS. 1–5. As illustrated in FIGS. 1 and 2, the computer 10 includes a removable side panel 12, a stationary side panel 13 and a bezel panel 14. The side panels 12, 13 and the bezel panel 14 are attached to a chassis 16. The removable side panel 12 is pivotally attached to the chassis 16 and is removable to provide access to contents mounted on the chassis 16. The stationary side panel 13 may be removed, but access to the contents within the chassis 16 are not generally accessible from behind the stationary side panel 13. The removable side panel 12 is substantially at a right angle relative to the bezel panel 14.

The chassis 16, FIG. 3, includes a base portion 18, a top surface 21, a front wall 22, and a side wall 23. An access opening 25, FIG. 3, is provided to permit access for the assembly and maintenance of system components mounted within the chassis 16. The chassis 16 is typically made from sheet metal using a process such as sheet metal forming and stamping.

The removable side panel 12 is movable between a closed position C1, FIG. 1, and an open position O1, FIG. 2. A latch 20 is attached to the top surface 21, FIGS. 2 and 3, of the chassis 16. The removable side panel 12 includes retaining members 24, FIG. 2, and the latch 20 includes catch portions 26 that engage the retaining members 24 to secure the removable side panel 12 in the closed position C1. The removable side panel 12 is secured in the closed position C1 when the latch 20 is in a static position S, FIG. 1. The latch 20 may be moved to a first displaced position D1, FIG. 2, to release the removable side panel 12 and allow it to be moved to the open position O1.

Figure 4:
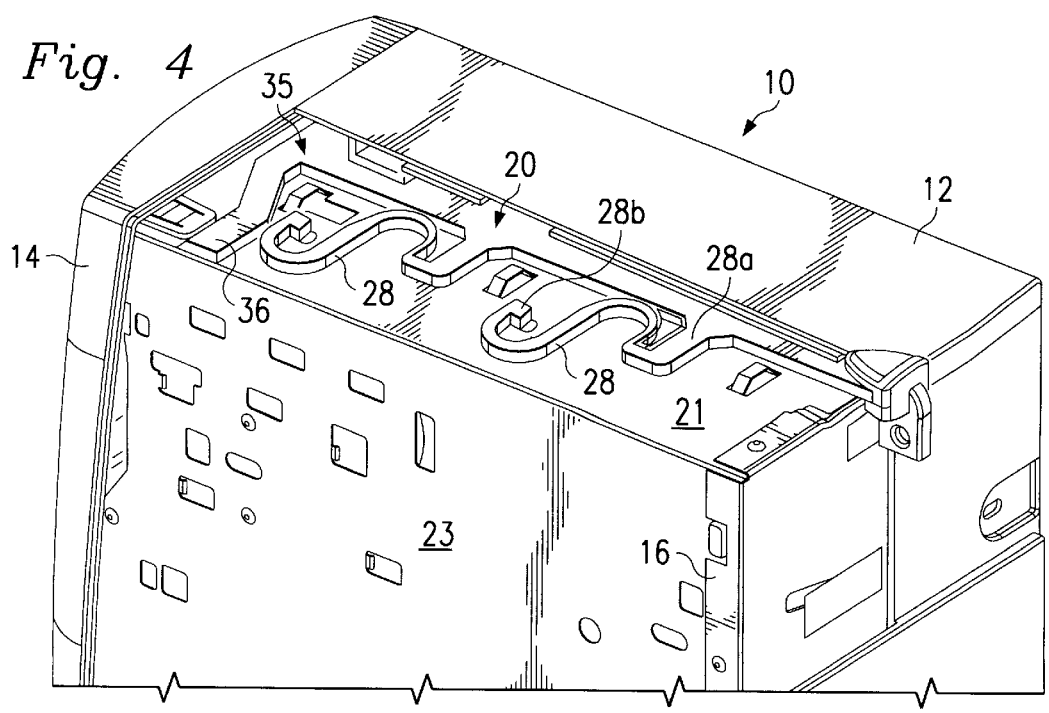
FIG. 4 is a fragmented perspective view illustrating an embodiment of the computer with a stationary panel removed.

One or more resilient members 28, FIG. 4, are connected to latch 20 and function to couple chassis 16 and the latch 20 for biasing the latch 20 to the static position S. A first end 28a of each resilient member 28 is attached to the latch 20 and a second end 28b is attached to the chassis 16.

The bezel panel 14 is pivotally attached to the chassis 16 adjacent to the base portion 18, enabling the bezel panel 14 to be moved between a closed position C2, FIG. 1, and an open position O2, FIG. 3. A peripheral device such as a compact disc drive or a floppy disk drive is mountable in the chassis 16 behind the bezel panel 14. The bezel panel 14 may include an integral bezel 30, FIG. 1 or a bezel plate opening 14a for receiving a discrete bezel plate (not shown) to provide access to the peripheral device when the bezel panel 14 is in the closed position C2.

Figure 5:
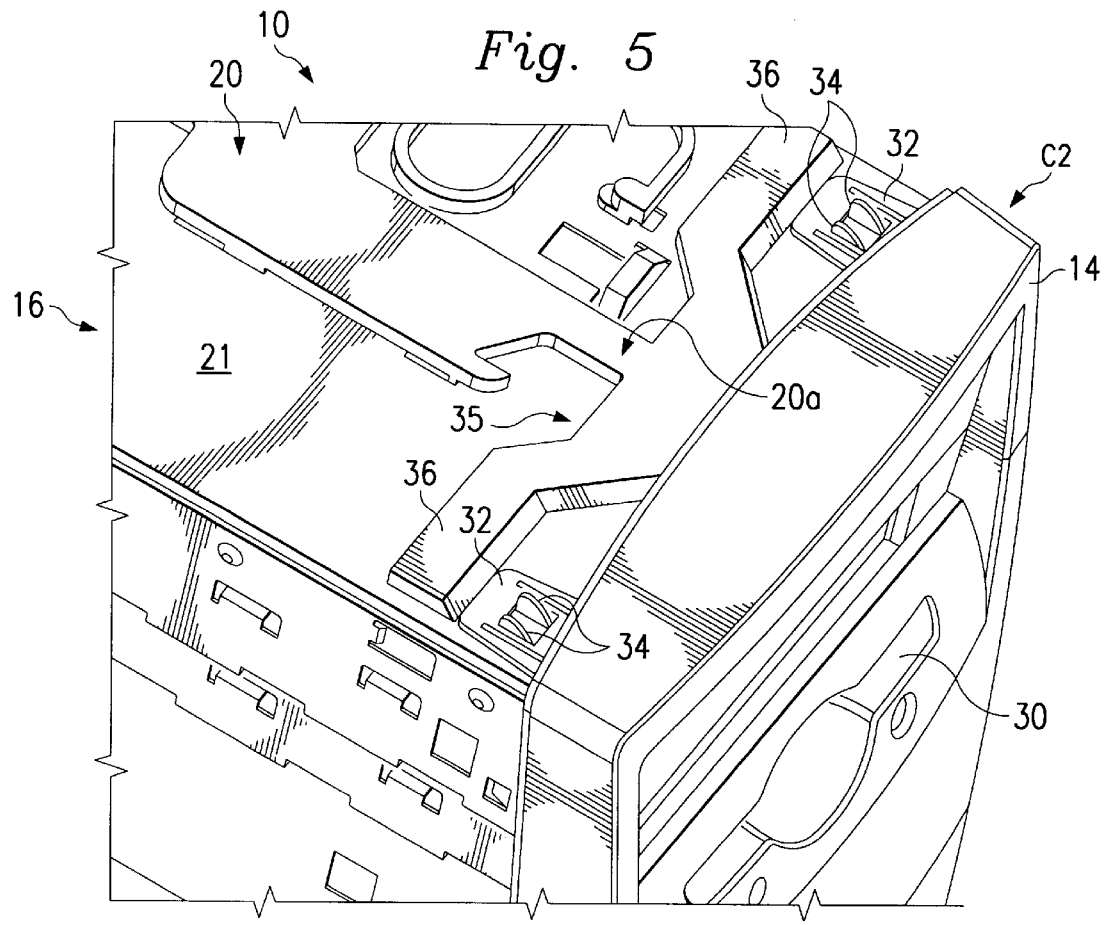
FIG. 5 is a fragmented perspective view illustrating an embodiment of a top portion of a chassis.

As illustrated in FIG. 5, two flexible or resilient retention members 32 are attached to the bezel panel 14 and two sets of flanges 34 are attached to the chassis 16. Each one of the retention members 32 engages a corresponding set of flanges 34 for securing the bezel panel 14 in the closed position C2. The latch 20 includes a release portion 35 at a first end 20a. The release portion 35 includes a release member 36 positioned adjacent to each one of the retention members 32.

Figure 6:
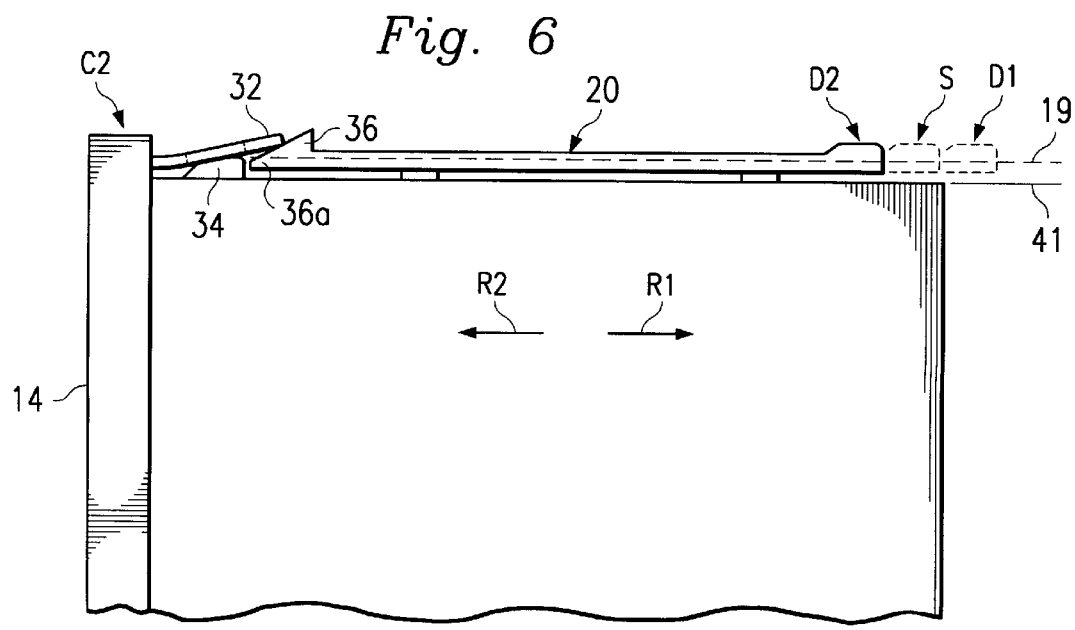
FIG. 6 is a side view diagrammatically illustrating an embodiment of a latch in a static position and a bezel panel in a closed position.
Figure 7:
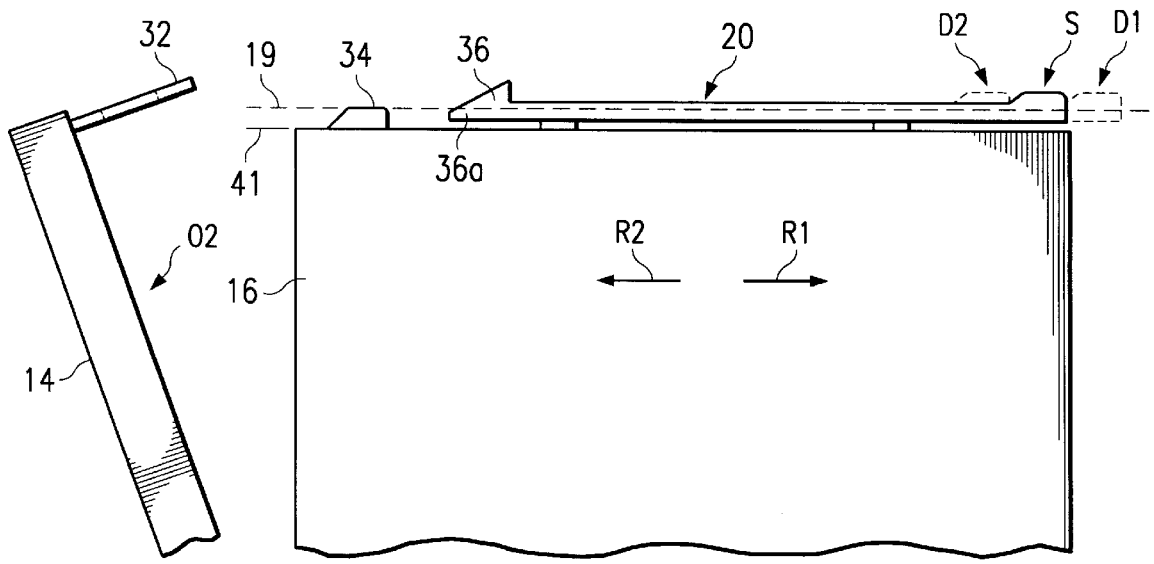
FIG. 7 is a side view diagrammatically illustrating an embodiment of a latch in a displaced position and a bezel panel in an open position.

Referring now to FIGS. 6 and 7, the release members 36 include a beveled edge portion 36a, FIG. 3. Each beveled edge portion 36a engages the corresponding retention member 32 when the latch 20 is moved to a second displaced position D2. The engagement of the beveled portions 36a with the retention members 32 deflects the retention member 32, thereby disengaging the retention members 32 from their respective flanges 34. With the retention members 32 disengaged from the corresponding flanges 34, the bezel panel 14 may be moved from the closed position C2 to the open position O2.

In the embodiment illustrated, the first displaced position D1, the second displaced position D2 and the static position S lie on a common axis 19. The static position S is positioned between the first displaced position D1 and the second displaced position D2. The latch 20 is reciprocally movable away from the bezel panel 14 to achieve the first displaced position D1, and is also movable toward the bezel panel 14 to achieve the second displaced position D2.

Figure 8A:
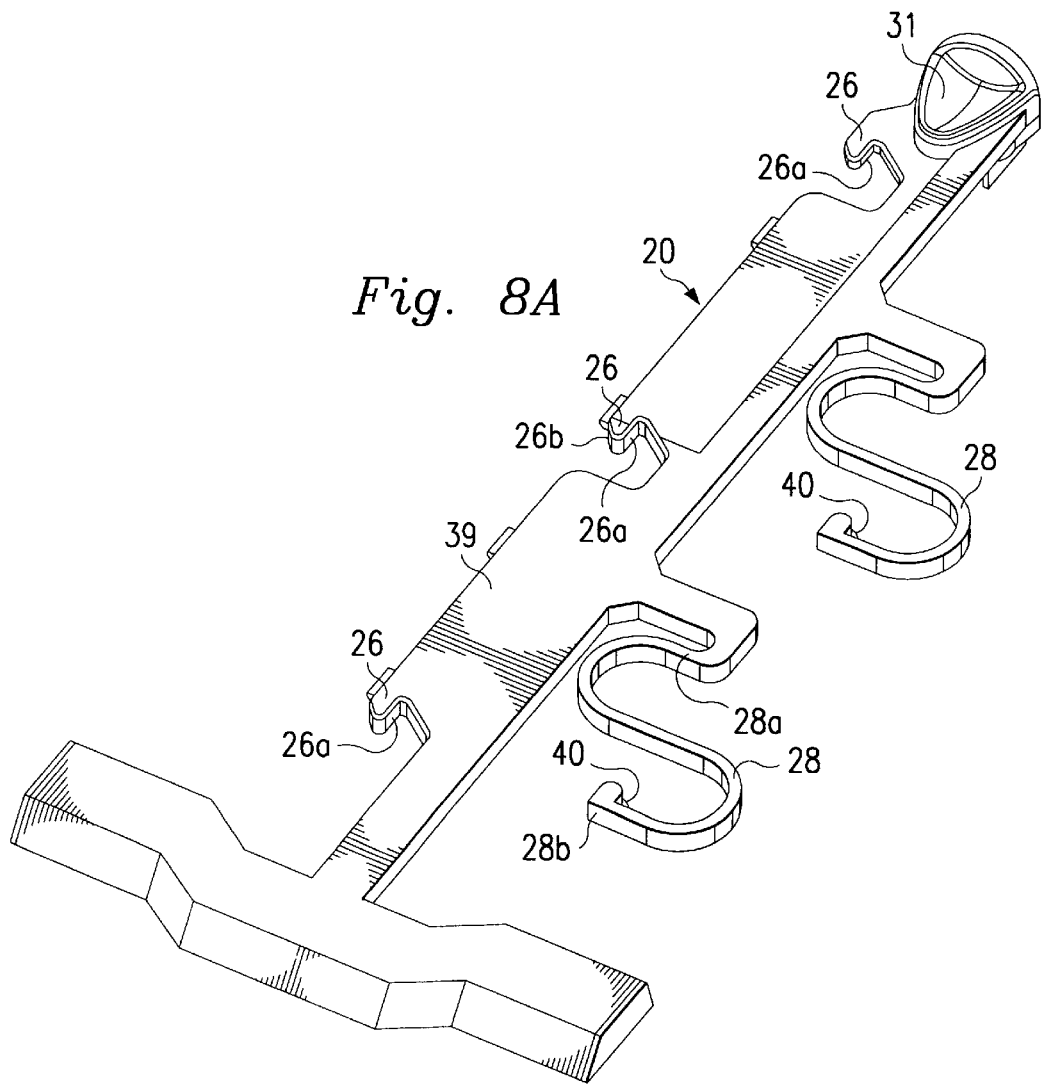
FIG. 8A is a top view of a latch.

The latch 20 includes an elongated beam portion 39, FIGS. 8A and 8B. The catch portions 26, a finger receptacle 31, a locking tab 33, pins 37, and latch mounting tabs 38 are attached to the beam portion 39. A retention tab 40 is attached to second end 28b of each resilient member 28. Each catch portion 26 includes a retention surface 26a and a lead-in surface 26b. When the removable side panel 12 is in the closed position C1, FIG. 1, each retaining member 24, FIG. 2, is engaged by the retention surface 26a of the corresponding catch portion 26. The lead-in surface 26b has a contoured profile. The contoured profile is configured such that when the removable side panel 12 is being moved from the open position O1, FIG. 2, to the closed position C1, FIG. 1, the engagement of each retaining member 24 against the lead-in surface 26b, of a corresponding catch portion 26 urges the latch 20 toward the first displaced position D1 without having to manually manipulate the latch 20.

The catch portions 26, resilient members 28, beam portion 39, finger receptacle 31, locking flange 35, pins 37, latch mounting tabs 38 and retention tabs 40, FIGS. 8A and 8B, may be integrally formed from a polymeric material such as Polycarbonate, Acrylonitrile Butadiene Styrene (commonly known as ABS) or a combination thereof using a process such as injection molding. Although the resilient members 28 are shown to be integrally formed with the latch 20, discrete types of springs such as compression, torsion and leaf springs are also contemplated to be useful as resilient members within the scope of this disclosure.

Figure 9:
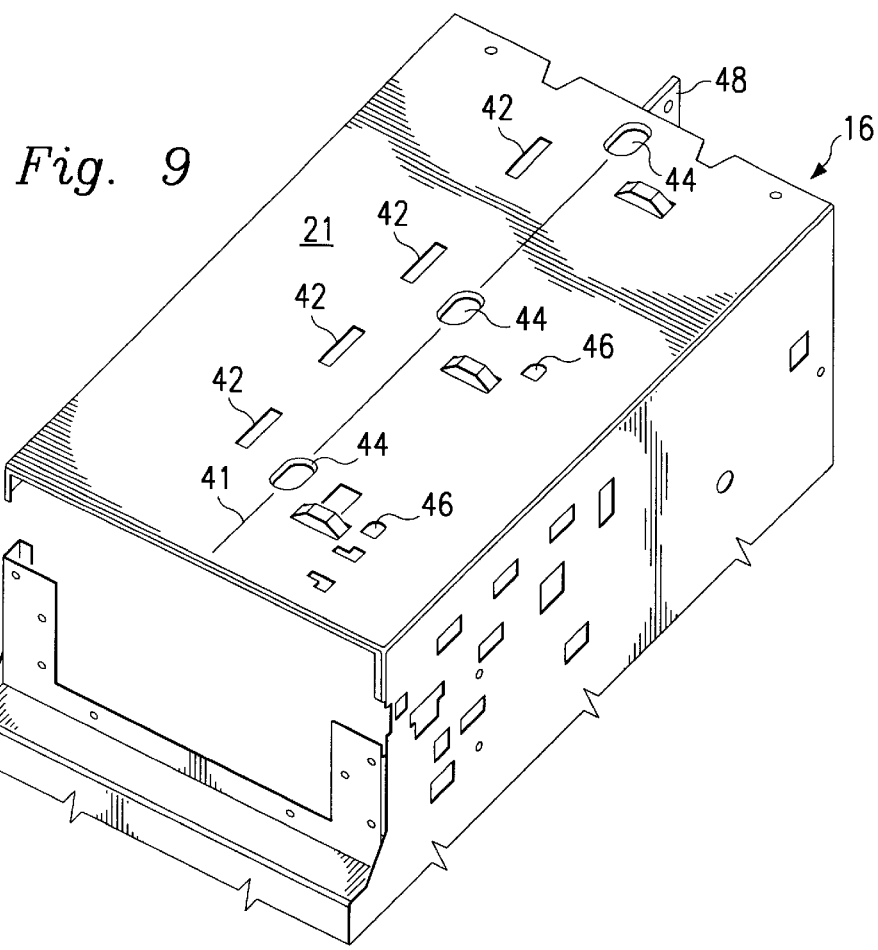
FIG. 9 is a fragmented perspective view illustrating an embodiment of the chassis of FIG. 3.

Each pin 37, latch mounting tab 38 and retention tab 40 is received in a respective corresponding opening 42, opening 44 and opening 46, FIG. 9, formed in the chassis 16. Each opening 42 and each opening 44 are elongated to allow the latch 20 to be displaced from the static position S to the first displaced position D1 and from the static position S to the second displaced position D2. The openings 44 are aligned to define a longitudinal axis 41, substantially parallel to axis 19, FIGS. 6 and 7, along which the latch 20 is displaced. The opening 46 and the retention tab 40 are configured to constrain the second end 28b of each resilient member 28 thus spring loading the latch body 20 on the chassis 16 for returning the latch body 20 to the static position S. A locking flange 48, FIG. 9, is attached to the chassis 16. A security device such as a lock may be attached to the locking tab 33 and locking flange 48 to restrain the latch 20 from being displaced from the static position S.

Figure 10:
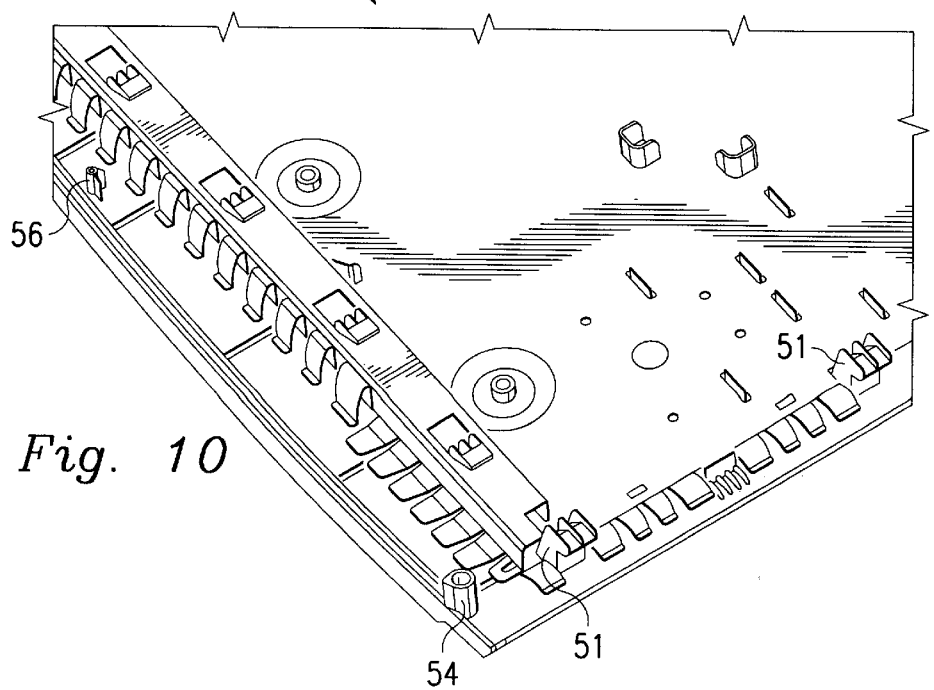
FIG. 10 is a fragmented perspective view illustrating an embodiment of the chassis mounting portion of a side panel.
Figure 11:
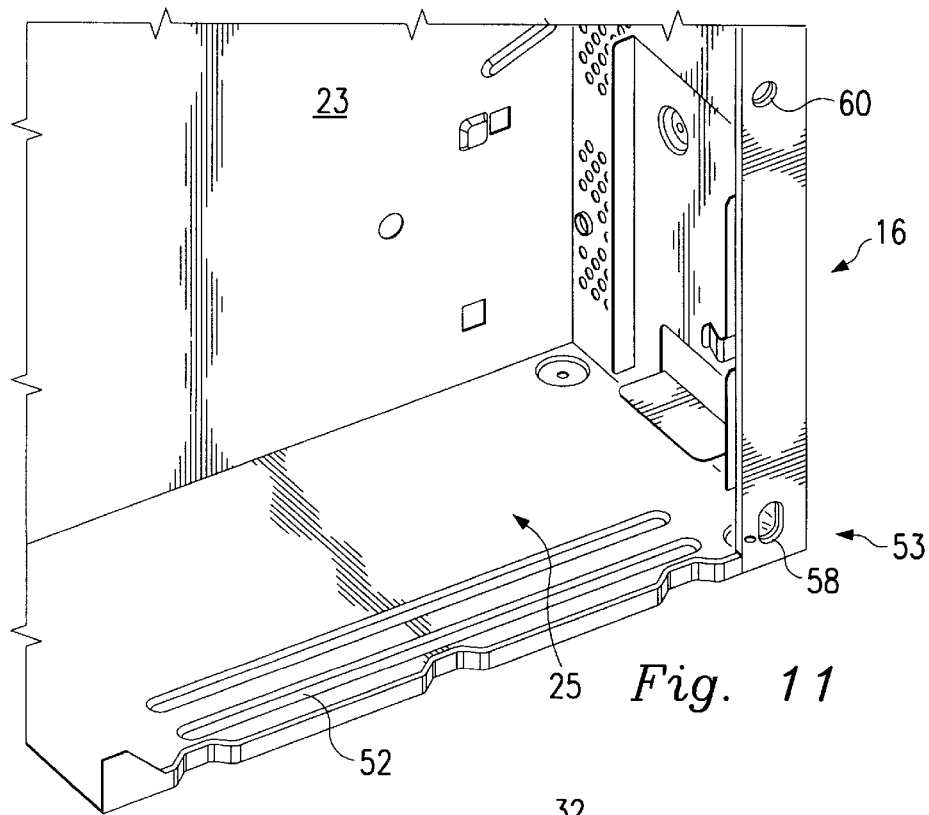
FIG. 11 is a fragmented perspective view illustrating an embodiment of a side panel mounting portion of a chassis.

Referring now to FIGS. 10 and 11, the removable side panel 12, FIG. 10, includes mounting members 51 that engage a recessed portion 52, FIG. 11, adjacent to a bottom portion 53 of the chassis 16. The mounting members 51 releasably engage the recessed portion 52 of the chassis 16 to allow the removable side panel 12 to pivot and be easily removed from the chassis 16 without the use of tools or having to manipulate fasteners such as screws.

The removable side panel 12 is attached to the chassis 16 by engaging the mounting members 51 in the recessed portion 52 of the chassis 16. The panel 12 is then pivoted toward the chassis 16 until each retaining member 24, FIG. 2, comes into contact with the lead-in surface 26b of the corresponding catch portion 26. By continuing to pivot the panel 12 toward the chassis 18, each retaining member 24 acts on the corresponding lead-in surface 26b of the corresponding catch portion 26 to move the latch 20 toward the first displaced position D1. With continued pivoting, the latch 20 becomes sufficiently displaced toward the first displaced position D1 such that each retaining member 24 clears the corresponding catch portion 26. Once the retaining members 24 clear the catch portions 26, the latch 20 returns to the static position S such that each retaining member 24 is engaged by the respective retention surface 26a.

First alignment pins 54, FIG. 10, are provided for grossly aligning the removable side panel 12 with the chassis 16. The alignment pins 54 simplify positioning of the removable side panel 12 during installation. The alignment pins 54 are attached adjacent to each opposing edge of the removable side panel 12. One or more second alignment pins 56 are also attached adjacent to each opposing edge of the removable side panel 12 for insuring that the removable side panel 12 is properly aligned with the chassis 16. The alignment pins 54, 56 engage corresponding apertures 58, 60, respectively, formed in the chassis 16. Each aperture 58 is sized to provide a relatively large amount of clearance with respect to the corresponding first alignment pin 54. Each aperture 60 is sized to provide a relatively small amount of clearance with respect to the corresponding second alignment pin 56.

Figure 12:
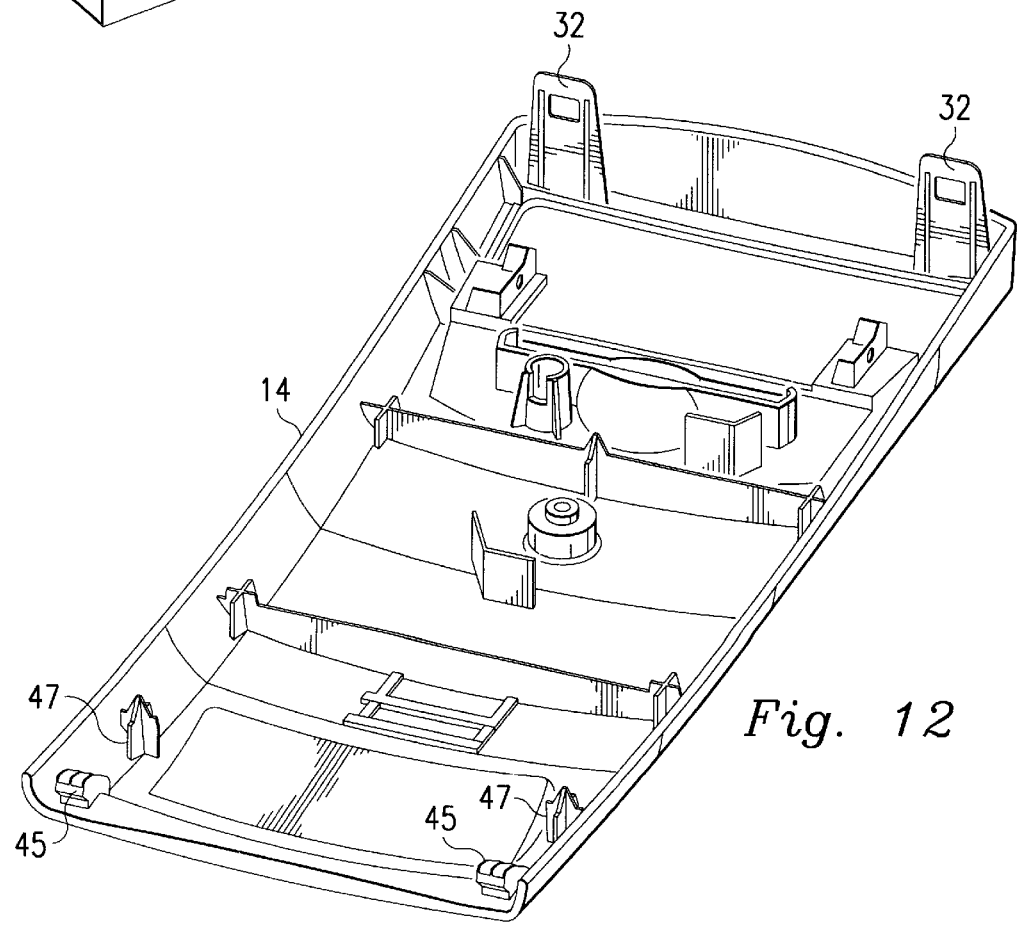
FIG. 12 is a perspective view illustrating an embodiment of a bezel panel.

FIG. 12 illustrates an embodiment of a bezel panel 14. The retention members 32 are attached to the bezel panel 14 adjacent to a first end thereof. Retaining members 45 are attached to the bezel panel 14 adjacent to a second end thereof. Alignment pins 47 are attached to the panel at a position between the retention members 32 and the retaining members 45.

Figure 13:
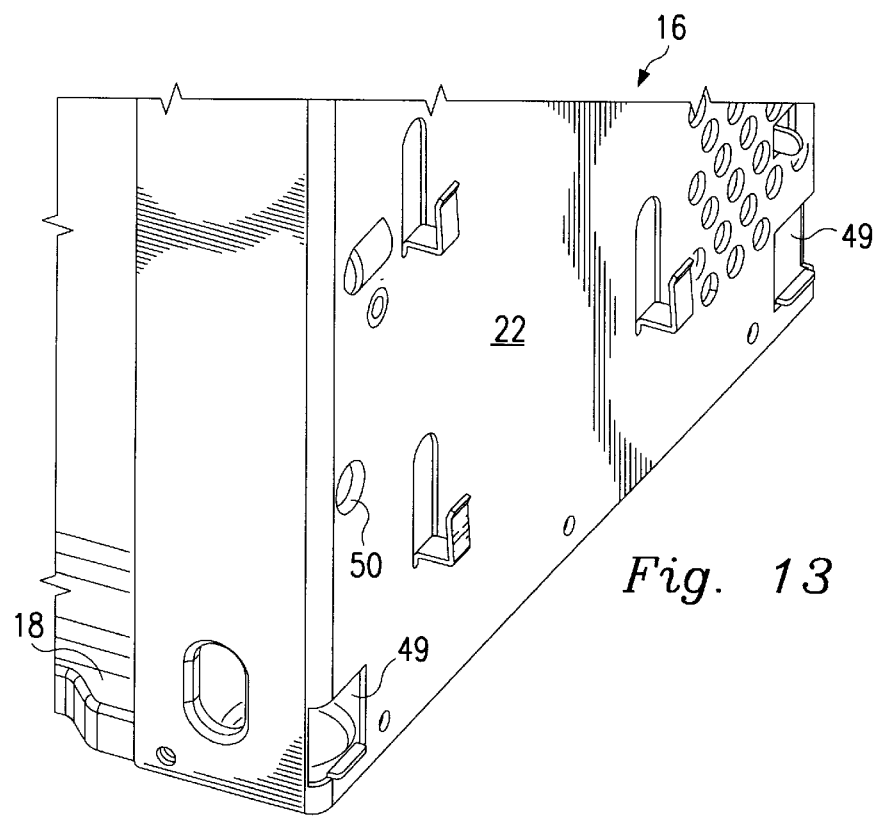
FIG. 13 is a fragmented perspective view illustrating an embodiment of a bezel panel mounting portion of a chassis.

Each one of the retaining members 45 is received by an opening 49, FIG. 13, formed in the chassis 16 adjacent to the base portion 18 such that the bezel panel 14 can be pivoted with respect to the chassis 16. Each one of the alignment pins 47 is received by an aperture 50, FIG. 13, when the bezel panel 14 is moved to the closed position C2. The alignment pins 47 and apertures 50 are configured such that there is a relatively tight tolerance between the size of the alignment pins 47 and the apertures 50. Due to the tight tolerance, the alignment pins 47 and the apertures 50 provide for reliable and consistent alignment of bezel panel 14 with respect to the chassis 16.

The side panels 12,13 and the bezel panel 14 may be formed from a polymeric material such as Polycarbonate, Acrylonitrile Butadiene Styrene (commonly known as ABS) or a combination thereof using a process such as injection molding. The removable side panel 12, retaining members 24, alignment pins 54, 56 and the mounting members 51 may be integrally formed. Similarly, the bezel panel 14, the retention members 32, the retaining members 45 and alignment pins 46 may be integrally formed. When the bezel panel 14 and the retention members 32 are integrally formed from a polymeric material having suitable flexural characteristics, the retention members 32 may be designed to be resiliently deflectable with respect to the bezel panel 14 to facilitate being engaged with and disengaged from the flanges 34 of the chassis 16.

Figure 14:
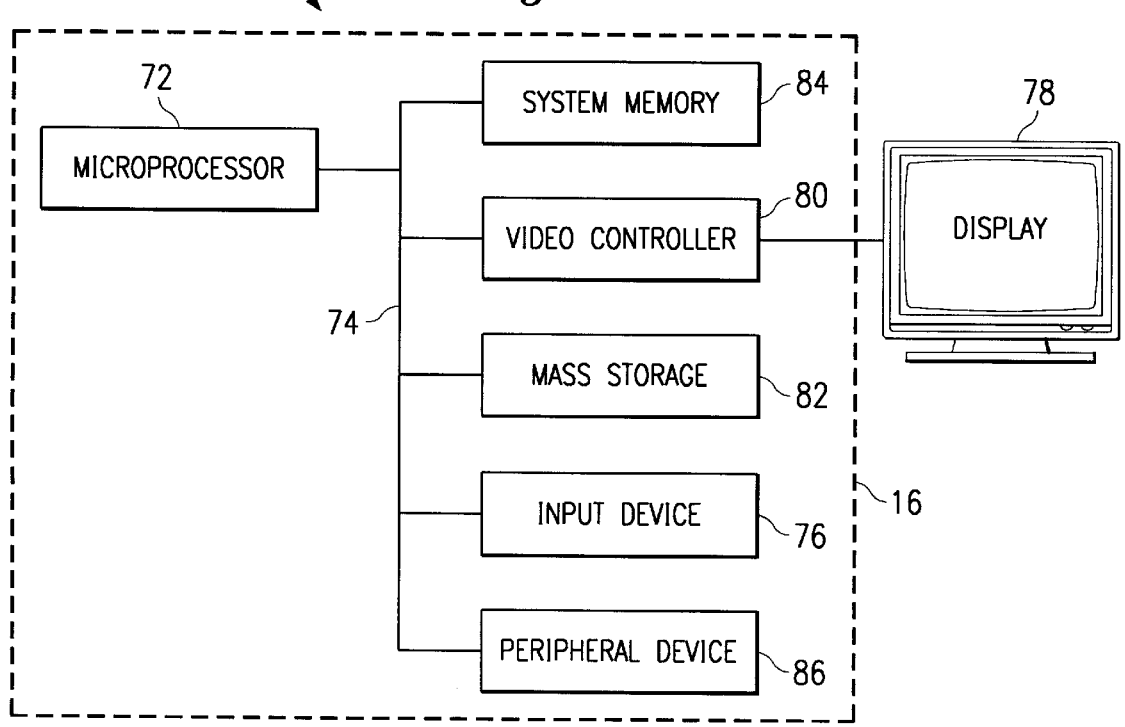
FIG. 14 is a block diagram illustrating an embodiment of a computer system.

An embodiment of a computer system 70 is illustrated in FIG. 14. The computer system 70 includes at least one microprocessor 72 mounted in chassis 16. The microprocessor 72 is connected to a bus 74. The bus 74 serves as a connection between the microprocessor 72 and other components of the computer system 70. One or more input devices 76 may be coupled to the microprocessor 72 to provide input to the microprocessor 72. Examples of input devices include keyboards, touchscreens, and pointing devices such as a mouse, a trackball and a trackpad. The computer system 70 may also include a display 78 which is coupled to the microprocessor 72 typically by a video controller 80. Programs and data are stored on a mass storage device 82 which is coupled to the microprocessor 72. Mass storage devices include components such as hard disks, optical disks, magneto-optical drives, floppy drives, and the like. A system memory 84 provides the microprocessor 72 with fast storage to facilitate execution of computer programs by the microprocessor 72. A peripheral device 86 may be connected to the microprocessor 72 for providing the computer system 70 with additional functionality. Examples of peripheral devices include floppy disk drives, hard disk drives, compact disc players, digital video disc players, memory card readers, and other types of devices. The various components of the computer system are typically mounted in an enclosure such as the chassis 16 discussed above. It should be understood that other busses and intermediate circuits can be employed between the components described above and microprocessor 72 to facilitate interconnection between the components and the microprocessor 72.

In operation, the removable side panel 12 is detached from the chassis 16 by removing a security device (if one is attached) from the locking tab 33 of the latch 20, and locking flange 48 of chassis 16. The latch 20 is moved from the static position S in a first direction R1 to the first displaced position D1 by means of finger receptacle 31, such that each retaining member 24 is disengaged from the corresponding catch portion 26 of the latch 20. The panel may then be pivoted away from the chassis 16 and detached from the chassis 16 by lifting it to disengage each mounting member 50 from the recessed portion 52. Once the removable side panel 12 is moved to the open position O1 or is detached from the chassis 16, the bezel panel 14 may be moved to the open position O2 or detached from the chassis 16. This is accomplished when the latch 20 is moved from the static position S in a second direction R2, opposite the first direction R1, to the second displaced position D2, thereby releasing the retention members 32 from the corresponding flanges 34. Thus, the latch 20 is reciprocally movable along its axis 19 which is substantially parallel to axis 41 along surface 21 of chassis 16.

It is contemplated within the scope of the present disclosure that a single retention member and flange may be employed to accomplish the benefits and advantages of the embodiments presented herein. Similarly, more than two retention members and flanges may be employed as deemed necessary or preferred for providing the benefits and advantages of the embodiments presented herein.

As a result, one embodiment provides a panel latch system including a chassis and a plurality of panels mounted on the chassis in a closed position. A latch body is mounted on the chassis for latched engagement with the panels. The latch body is movable between a static position and a plurality of displaced positions for unlatching the panels. A first latch portion on the latch body is provided for releasing a first panel in response to the latch body being moved from the static position to a first displaced position. A second latch portion on the latch body is provided for releasing a second panel in response to the latch body being moved from the static position to a second displaced position.

Another embodiment provides a computer system including a chassis having a microprocessor mounted therein. An input is coupled to provide input to the microprocessor and a mass storage is coupled to the microprocessor. A display is coupled to the microprocessor by a video controller. A memory is coupled to provide storage to facilitate execution of computer programs by the microprocessor. A plurality of panels are mounted on the chassis in a closed position. A latch body is mounted on the chassis for engagement with the panels. The latch body is movable between a static position and a plurality of displaced positions for unlatching the panels. A first latch portion is provided on the latch body for releasing a first panel in response to the latch body being moved in a first direction from the static position to a first displaced position. A second latch portion is provided on the latch body for releasing a second panel in response to the latch body being moved in a second direction from the static position to a second displaced position.

A further embodiment provides a method of releasably securing a plurality of panels on a chassis. A latch body is mounted on a chassis in a static position so that the latch body is reciprocally movable between a static position and a plurality of displaced positions. The latch body is coupled to the chassis so that the latch body is spring loaded to return to the static position. First and second panels are mounted on the chassis in latched engagement with the latch body. The latch is moved from the static position to a first displaced position for releasing the first panel from the latch body. The latch is also moved from the static position to a second displaced position for releasing the second panel from the latch body.

As it can be seen, the embodiments presented herein provide several advantages. The use of a single latch mechanism for releasing a plurality of panels from a chassis reduces manufacturing cost. The operation of attaching and releasing the plurality of panels is simplified. The panel may be precisely and repeatedly aligned and attached to the chassis of the computer system. The interior contents of the chassis may be inspected without fully removing the panel from the chassis. The latching mechanism is engaged and disengaged with minimal force, and without the use of tools or having to manipulate fasteners such as screws.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A panel latch system, comprising:

a chassis;

a plurality of panels mounted on the chassis in a closed position;

a latch body mounted on the chassis for latched engagement with the panels, the latch body being movable between a static position and a plurality of displaced positions for unlatching the panels;

a first latch portion on the latch body for releasing a first one of the panels in response to the latch body being moved from the static position to a first displaced position; and a second latch portion on the latch body for releasing a second one of the panels in response to the latch body being moved from the static position to a second displaced position.

2. The latch system of claim 1 wherein the plurality of displaced positions and the static position are disposed on a common axis and wherein the static position is disposed between the first displaced position and the second displaced position.

3. The latch system of claim 1 wherein the second latch portion includes a release member adjacent to an end of the latch body.

4. The latch system of claim 1 further comprising:

a resilient member attached to the latch body.

5. The latch system of claim 1 wherein the first latch portion includes two spaced apart release members.

6. The latch system of claim 1 further comprising:

an alignment member attached to each panel; and a respective aperture in the chassis for receiving each alignment member.

7. The latch system of claim 1 further comprising:
a guide member attached to the latch body; and
an elongated opening in a top surface of the chassis, the guide member being movably mounted in the opening.

8. The latch system of claim 3 wherein the release member includes a beveled edge portion.

9. The latch system of claim 4 wherein a resilient member includes a portion attached to the chassis for urging the latch body to the static position.

10. The latch system of claim 4 wherein the first displaced position is in a first direction relative to the static position, and the second displaced position is in a second direction relative to the static position.

11. The latch system of claim 4 wherein the resilient member includes a cantilevered portion.

12. The latch system of claim 8 wherein the beveled edge portion extends generally perpendicular to a longitudinal axis of the latch body.

13. The latch system of claim 8 wherein the second one of the panels includes a flexible retention member and the beveled edge flexes the retention member in response to moving the latch body to the second displaced position.

14. The latch system of claim 9 wherein the cantilevered portion is contoured.

15. The latch system of claim 10 wherein the contoured portion is S-shaped.

16. The latch system of claim 10 wherein the first direction is opposite the second direction and the latch body is spring loaded to return to the static position.

17. A panel latch system, comprising:
a chassis;
a plurality of panels mounted on the chassis in a closed position;
a latch body mounted on a top surface of the chassis for latched engagement with the panels, the latch body being movable between a static position and a plurality of displaced positions for unlatching the panels;
a first latch portion on the latch body for releasing a first one of the panels in response to the latch body being moved from the static position to a first displaced position;
a second latch portion on the latch body for releasing a second one of the panels in response to the latch body being moved from the static position to a second displaced position; and
the first and second panels being pivotally attached adjacent to a base portion of the chassis, the first panel being substantially at a right angle relative to the second panel.

18. A panel latch system, comprising:
a chassis;
a plurality of panels mounted on the chassis in a closed position;
a latch body mounted on the chassis for latched engagement with the panels, the latch body being movable between a static position and a plurality of displaced positions for unlatching the panels;
a first latch portion on the latch body for releasing a first one of the panels in response to the latch body being moved from the static position to a first displaced position;

a second latch portion on the latch body including a release member for releasing a second one of the panels in response to the latch body being moved from the static position to a second displaced position, the release member including a beveled edge portion;

the second one of the panels including a flexible retention member, whereby the beveled edge portion flexes the retention member in response to moving the latch body to the second displaced position; and the chassis including a flange for engagement with the flexible retention member.

19. A computer system, comprising:
a chassis;
a microprocessor mounted in the chassis;
an input coupled to provide input to the microprocessor;
a mass storage coupled to the microprocessor;
a video controller coupled to the microprocessor;
a memory coupled to provide storage to facilitate execution of computer programs by the microprocessor;
a plurality of panels mounted on the chassis in a closed position;
a latch body mounted on a top surface of the chassis for latched engagement with the panels, the latch body being movable between a static position and a plurality of displaced positions for unlatching the panels;
a first latch portion on the latch body for releasing a first panel in response to the latch body being moved in a first direction from the static position to a first displaced position;
a second latch portion on the latch body for releasing a second panel in response to the latch body being moved in a second direction from the static position to a second displaced position; and
the first and second panels being pivotally attached adjacent to a base portion of the chassis such that the first panel is substantially at a right angle to the second panel.

20. A method of releasably securing a plurality of panels on a chassis, comprising:
mounting a latch body on a top surface of the chassis so that the latch body is reciprocally movable between a static position and a plurality of displaced positions;
coupling the latch body to the chassis so that the latch body is spring loaded to return to the static position;
mounting a first panel and a second panel on the chassis in latched engagement with the latch body;
pivotally attaching the first and second panels adjacent to a base portion of the chassis such that the first panel is substantially at a right angle to the second panel;
moving the latch body from the static position to a first displaced position for releasing the first panel from the latch body; and
moving the latch body from the static position to a second displaced position for releasing the second panel from the latch body.

* * * * *